UNITED STATES PATENT OFFICE.

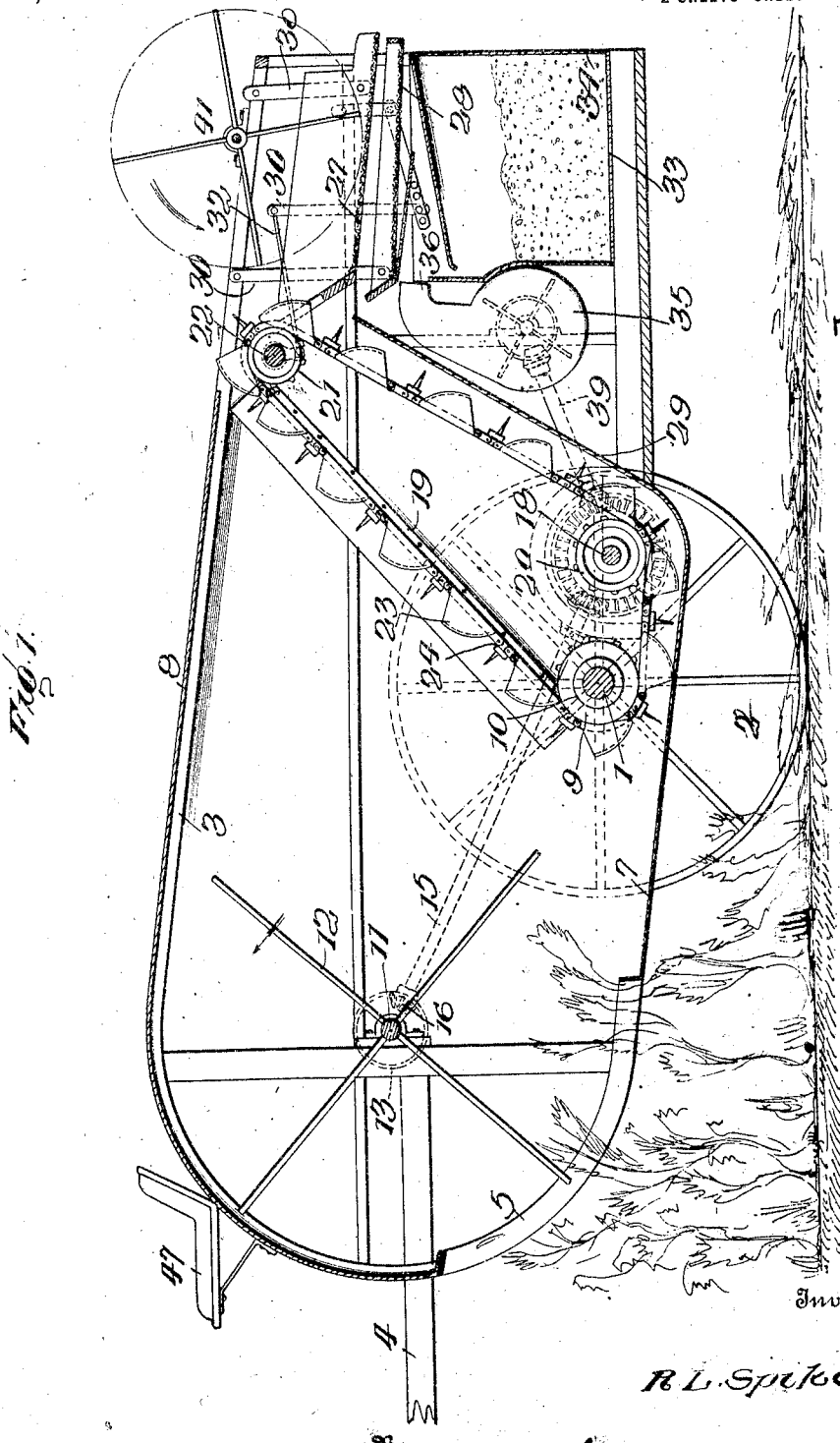

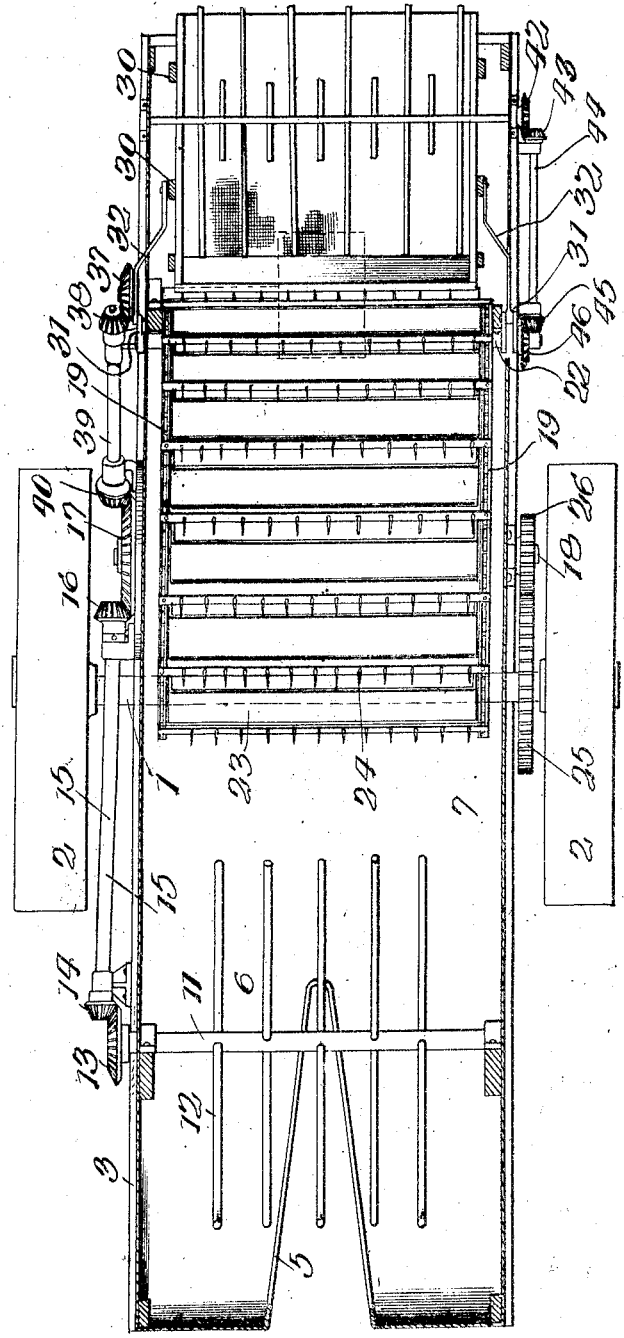

ROBERT L. SPIKES, OF FARMVILLE, NORTH CAROLINA.

BEAN AND PEA HARVESTER AND SEPARATOR.

1,218,011.   Specification of Letters Patent.   Patented Mar. 6, 1917.

Application filed February 7, 1916. Serial No. 76,637.

*To all whom it may concern:*

Be it known that I, ROBERT L. SPIKES, a citizen of the United States, residing at Farmville, in the county of Pitt and State of North Carolina, have invented certain new and useful Improvements in Bean and Pea Harvesters and Separators, of which the following is a specification.

The present invention relates to harvesting machinery and more particularly to harvesters for gathering beans, peas and the like and at the same time separating the berries from the vines, pods and other particles of a more or less deleterious nature.

The invention is designed to provide novel gathering means whereby the berries and pods are directed to proper position to be separated from the vines and also to provide means for separating broken pods, vines and the like from the berries with the result that the product when harvested is ready for the market.

With these and other objects in view, which will readily appear as the nature of the invention is better understood, the same consists in the improved construction and novel arrangement and combination of parts which will be hereinafter first fully described and then particularly set forth in the claims.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings:—

Figure 1 is a vertical central longitudinal section of a harvester embodying the invention;

Fig. 2 is a top plan view thereof with parts in horizontal section.

The harvester is mounted so as to travel over the field, and, as shown, comprises an axle 1 and ground wheels 2. A suitable frame 3 is mounted upon the axle and receives the working parts and is adapted to have the propelling force applied thereto in any manner, the drawing showing a draft pole or tongue 4 extending from the front end of the frame which is convex or curved so as to readily pass over bushes or past other objects. The gathering mechanism is located at the forward end of the machine and the separating mechanism is disposed at the rear of the machine while an elevator is located between the ends of the machine and delivers the product from the gathering mechanism to the separator. A V-shaped guide 5 is located at the forward end of the machine and directs the heads of the vines to a central point so as to be acted upon by the reel or beater 6 by means of which the pods are detached from the vines or are opened so as to release the berries which are received upon a pan 7 at the rear of the guide. The guide 5 is disposed at such a level as to engage with the vines and direct the pods to a position where they will be acted upon by the beater or reel. The pan 7 for receiving the product when harvested forms the bottom of the frame and may merge into a cover 8. The pan is preferably constructed of sheet metal and embodies portions which extend along opposite sides of the guide 5 and beneath the vertical sides of the frame and inclines downwardly and rearwardly as shown.

The beater or reel is arranged above the guide 5 and pan 7 and comprises a shaft 11 and arms 12 carried thereby. A beveled gear 13 is secured to one end of the reel shaft and meshes with a bevel pinion 14 secured to the upper forward end of a shaft 15 which is mounted on the frame at one side of the machine. A pinion 16 at the lower end of the shaft 15 meshes with a gear wheel 17 secured to one end of a shaft 18 which is arranged transversely on the frame in rear of the axle 1 and is driven from the same. The reel or beater is driven so as to rotate in an anti-clockwise direction whereby to strike the vines and drive the pods and berries detached therefrom rearward to drop upon the pan.

An elevator is located in the rear of the pan and is adapted to receive the product therefrom and deliver the same to the separator. The elevator comprises endless sprocket chains 19 which pass around sprocket wheels 20 secured to the shaft 18 and other sprocket wheels 21 secured on a shaft 22 which is located above and in rear of the shaft 18. The sprocket chains 19 also pass around sprocket wheels 9 which are loose on the axle 1 and held against longitudinal movement thereon by stop collars 10. The elevator comprises buckets 23 and toothed slats 24 secured to and extending between the sprocket chains, the slats and buckets being arranged alternately as clearly shown. The toothed slats engage the vines and pods and carry them upwardly to the separator while the buckets take up the berries and deliver them to the separator. The shaft 18 actuates the elevator and the beater 6 and is driven by a gear wheel 25 on the axle which meshes with a pinion 26 on the end of the shaft.

The separator comprises a plurality of screens 27 and 28 located at the rear end of the machine in position to receive the product from the elevator, and it will be noted upon reference to Fig. 1 that a plate 29 forming, in effect, a prolongation of the pan, extends from the rear end of the pan under the elevator to the separator so that any berries which may drop from the elevator will be saved and will return to the pan to be again taken up by the elevator. The screens may be reciprocated in any manner and are supported by a plurality of links 30. The shaft 22 is provided with crank arms 31 which are connected by rods 32 with some of the links 30 so as to insure a vibratory movement being imparted to the separating screens.

A receptacle 33 is located below the separator to receive the berries, access to the receptacle being had by means of a door 34 provided in a side thereof. The vines, pods and like material delivered by means of the elevator to the separator are discharged at the rear ends of the separating screens whereas the berries and small particles pass through the meshes of the screen. The small particles of broken pods and vines are carried off by means of an air blast which is delivered through the separator. The berries being heavy are not materially affected by the blast of air, hence drop into the receptacle but the light particles are carried off with the blast. A fan 35 is located in the space formed between the elevator and receptacle and its spout 36 is arranged to deliver a blast across and through the screens of the separator so as to carry off light particles. A gear wheel 37 secured on one end of the fan shaft is in mesh with a pinion 38 secured to one end of a shaft 39 which is mounted on the side of the frame and has its opposite end provided with a pinion 40 which is in mesh with the gear wheel 17. By the means thus set forth the fan is operated. Above the separator is a second beater 41 which has its shaft mounted in suitable bearings on the frame and equipped with a pinion 42 at one end which meshes with a pinion 43 on the end of a shaft 44, a pinion 45 at the opposite end of said shaft meshing with a pinion 46 on the end of the shaft 22 as shown in Fig. 2.

It is to be remembered that beans, peas and the like are planted in rows and in the harvesting thereof the machine is advanced over the field in such a manner as to cause the vines to enter the open end of the guide 5. The guide gives proper support to the vines which latter are acted upon by means of the beater or reel 6 which breaks the pods from the vines or liberates the berries from the pod. The action of the beater or reel is such as to separate the berries and pods from the vines and portions of the latter are broken off and are received in the pan together with the pods and berries. The mass of material received upon the pan moves rearward and the liberated berries collect at the rear of the pan and are taken up by the buckets of the elevator and delivered to the separator. The broken vines and pods are engaged by the toothed portions of the elevator and are likewise carried upward and delivered to the separator. The larger parts of the vines and pods are swept over the separator by the beater 41 and drop upon the ground while the berries and small particles pass through the meshes of the screens and are subjected to the blast of air. The berries continue to fall and drop into the receptacle whereas the small particles are deflected and carried off with the blast of air. It will thus be understood that the machine harvests and cleans the berries at one operation, thereby avoiding the necessity for a second handling of the product in order to separate the same when preparing the berries either for market or to be canned or otherwise conserved for future use. As the lower end of the elevator is extended around and in advance of the axle, the vines cannot lodge and pack on the axle but will positively be taken up by the elevator. A driver's seat 47 is provided on the front end of the frame.

Having thus described the invention, what is claimed as new is:

1. In a harvester of the character set forth, the combination of gathering means, a longitudinally extending pan arranged to receive the product from the gathering means, a separator, an elevator arranged to convey the product from the pan to the separator, and a plate extending from and forming a prolongation of the bottom of the pan under the elevator to the separator.

2. In a harvester of the character set forth, the combination of a frame having a cover provided with a downwardly curved front end, a pan disposed longitudinally of the frame at the bottom thereof and having an upwardly curved front end meeting the downwardly curved front end of the cover, a guide located centrally in the front end of the pan, a beater mounted within the frame above the guide and the front end of the pan and concentric with the curved front ends of the pan and the cover, and a conveyer at the rear of the pan, the pan having an upwardly extending prolongation arranged in proximity to the conveyer.

In testimony whereof I affix my signature.

ROBERT L. SPIKES. [L. S.]